United States Patent
Wang et al.

(10) Patent No.: US 10,819,111 B2
(45) Date of Patent: Oct. 27, 2020

(54) MULTI-PORT POWER SUPPLY APPARATUS AND POWER SUPPLYING METHOD THEREOF

(71) Applicant: VIA LABS, INC., New Taipei (TW)

(72) Inventors: Tze-Shiang Wang, New Taipei (TW); Sheng-Hsien Yen, New Taipei (TW)

(73) Assignee: VIA LABS, INC., New Taipei (TW)

( * ) Notice: Subject to any disclaimer, the term of this patent is extended or adjusted under 35 U.S.C. 154(b) by 147 days.

(21) Appl. No.: 16/178,598

(22) Filed: Nov. 2, 2018

(65) Prior Publication Data

US 2020/0091811 A1    Mar. 19, 2020

(30) Foreign Application Priority Data

Sep. 14, 2018 (TW) .............................. 107132494 A

(51) Int. Cl.
*H02J 1/14* (2006.01)
*H02J 1/00* (2006.01)
*H02M 1/00* (2006.01)

(52) U.S. Cl.
CPC ........ *H02J 1/14* (2013.01); *H02J 1/00* (2013.01); *H02J 1/001* (2020.01);
(Continued)

(58) Field of Classification Search
CPC ....... H02M 2001/007; H02M 2001/008; H02J 1/00; H02J 1/14; H02J 1/001; H02J 2310/10
See application file for complete search history.

(56) References Cited

U.S. PATENT DOCUMENTS

2003/0193364 A1   10/2003   Liu et al.
2010/0156176 A1*   6/2010   Kim ..................... H02J 1/00
                                                                307/31
(Continued)

FOREIGN PATENT DOCUMENTS

CN           1877954        12/2006
CN         102055363         5/2011
(Continued)

OTHER PUBLICATIONS

"Office Action of China Counterpart Application," dated Aug. 1, 2019, p. 1-p. 7.
(Continued)

*Primary Examiner* — Fred E Finch, III
*Assistant Examiner* — Rafael O De Leon Domenech
(74) *Attorney, Agent, or Firm* — JCIPRNET

(57) ABSTRACT

A multi-port power supply apparatus and a power supplying method thereof are provided. The multi-port power supply apparatus includes a power supply circuit, a plurality of connecting ports, a plurality of power converters, and a common control circuit. The power supply circuit is configured to provide a source electric energy to the power converters. Any one of the power converters converts the source electric energy into an output electric energy and outputs the output electric energy to the corresponding connecting port. The common control circuit dynamically adjusts the source electric energy by controlling the power supply circuit according to a plurality of voltage demands and a plurality of power demands of the connecting ports, so as to enhance voltage conversion efficiency of the multi-port power supply apparatus.

12 Claims, 6 Drawing Sheets

(52) U.S. Cl.
CPC .... *H02J 2310/10* (2020.01); *H02M 2001/007* (2013.01); *H02M 2001/008* (2013.01)

(56) References Cited

U.S. PATENT DOCUMENTS

| | | | | |
|---|---|---|---|---|
| 2010/0280676 A1* | 11/2010 | Pabon | .................... | G06F 1/266 |
| | | | | 700/295 |
| 2011/0057724 A1* | 3/2011 | Pabon | .................. | H02M 7/219 |
| | | | | 327/581 |
| 2013/0119962 A1* | 5/2013 | Holmberg | ............ | H02M 3/158 |
| | | | | 323/304 |
| 2018/0120910 A1* | 5/2018 | Farkas | .................... | G06F 1/189 |
| 2018/0205242 A1* | 7/2018 | Kelly-Morgan | ....... | H01G 4/228 |

FOREIGN PATENT DOCUMENTS

| | | |
|---|---|---|
| CN | 102142772 | 8/2011 |
| CN | 102224666 | 10/2011 |
| TW | 201301707 | 1/2013 |
| TW | I498704 | 9/2015 |
| TW | I542122 | 7/2016 |
| TW | M564287 | 7/2018 |

OTHER PUBLICATIONS

"Office Action of Taiwan Counterpart Application," dated Mar. 26, 2019, p. 1-p. 6.

* cited by examiner

MULTI-PORT POWER SUPPLY APPARATUS AND POWER SUPPLYING METHOD THEREOF

CROSS-REFERENCE TO RELATED APPLICATION

This application claims the priority benefit of Taiwan application serial no. 107132494, filed on Sep. 14, 2018. The entirety of the above-mentioned patent application is hereby incorporated by reference herein and made a part of this specification.

BACKGROUND OF THE INVENTION

Field of the Invention

The disclosure relates to a power supply apparatus and a power supplying method thereof, and more particularly, to a multi-port power supply apparatus including a plurality of connecting ports and a power supplying method thereof.

Description of Related Art

In general, when a power supply apparatus provides an electric energy to supply power to an external electronic apparatus, the power supply apparatus has to perform a voltage conversion operation according to a rated specification of the external electronic apparatus, so that an output voltage of the power supply apparatus can satisfy a demand voltage of the external electronic apparatus. The power supply apparatus may include a plurality of connecting ports and a plurality of voltage converters corresponding to the plurality of connecting ports to provide powers of different output voltages to a plurality of external electronic apparatuses having different demand voltages at the same time.

The voltage converters of the power supply apparatus convert the same source voltage into different output voltages. In general, this source voltage is fixed (namely, the level of the source voltage does not change as the voltage demands of the connecting ports change). Generally, the fixed level of this source voltage has to be very high in order to satisfy the high voltage demand of the connecting ports. For example, assuming that the voltage demands of the connecting ports fall within the range of 5 V to 20 V, then the fixed level of the source voltage may be 24 V. When the voltage demand of a connecting port is 20 V, the voltage converter of this connecting port converts the source voltage (i.e., 24 V) into the output voltage (i.e., 20 V). However, during voltage conversion, the greater the increase (or decrease) of the voltage, the lower the voltage conversion efficiency of the voltage converter. For example, when the voltage demand of a connecting port is 5 V, the voltage converter of this connecting port has to reduce the voltage from 24 V to 5 V. As the voltage converter reduces the voltage from 24 V to 5 V, the voltage conversion efficiency of the voltage converter is decreased. With the lower voltage conversion efficiency, the unconverted electric energy is lost in the form of heat, and thus heating of the power supply apparatus may occur.

Therefore, there is a need to provide a novel power supply apparatus to solve the problem of poor voltage conversion efficiency of the conventional power supply apparatus.

SUMMARY OF THE INVENTION

The invention provides a multi-port power supply apparatus and a power supplying method thereof that can dynamically adjust a source electric energy to improve a voltage conversion efficiency.

An embodiment of the invention provides a multi-port power supply apparatus. The multi-port power supply apparatus includes a power supply circuit, a plurality of connecting ports, a plurality of power converters, and a common control circuit. The power supply circuit is configured to provide a source electric energy. The plurality of power converters are respectively coupled to the connecting ports in a one-to-one manner. The power converters are coupled to the power supply circuit to receive the source electric energy. Any one of the power converters converts the source electric energy into an output electric energy and outputs the output electric energy to a corresponding connecting port among the connecting ports. The common control circuit is coupled to the connecting ports to learn voltage demands and power demands of the connecting ports. The common control circuit correspondingly controls the power supply circuit to dynamically adjust the source electric energy according to the voltage demands and the power demands of the connecting ports to improve a voltage conversion efficiency of the multi-port power supply apparatus.

An embodiment of the invention further provides a power supplying method adapted for a multi-port power supply apparatus. The multi-port power supply apparatus includes a power supply circuit, a plurality of connecting ports, a plurality of power converters, and a common control circuit. The power supplying method includes the following steps. The power supply circuit provides a source electric energy. The common control circuit learns voltage demands and power demands of the connecting ports. The common control circuit correspondingly controls the power supply circuit to dynamically adjust the source electric energy according to the voltage demands and the power demands of the connecting ports to improve a voltage conversion efficiency of the multi-port power supply apparatus. Any one of the power converters converts the source electric energy into an output electric energy and outputs the output electric energy to a corresponding connecting port among the connecting ports.

Based on the above, the multi-port power supply apparatus learns the voltage demands and the power demands of the plurality of connecting ports from the plurality of connecting ports. According to the voltage demands and the power demands, the multi-port power supply apparatus can dynamically adjust the source electric energy to thereby improve the voltage conversion efficiency of the multi-port power supply apparatus.

To provide a further understanding of the aforementioned and other features and advantages of the disclosure, exemplary embodiments, together with the reference drawings, are described in detail below.

DESCRIPTION OF THE EMBODIMENTS

Figure 1:
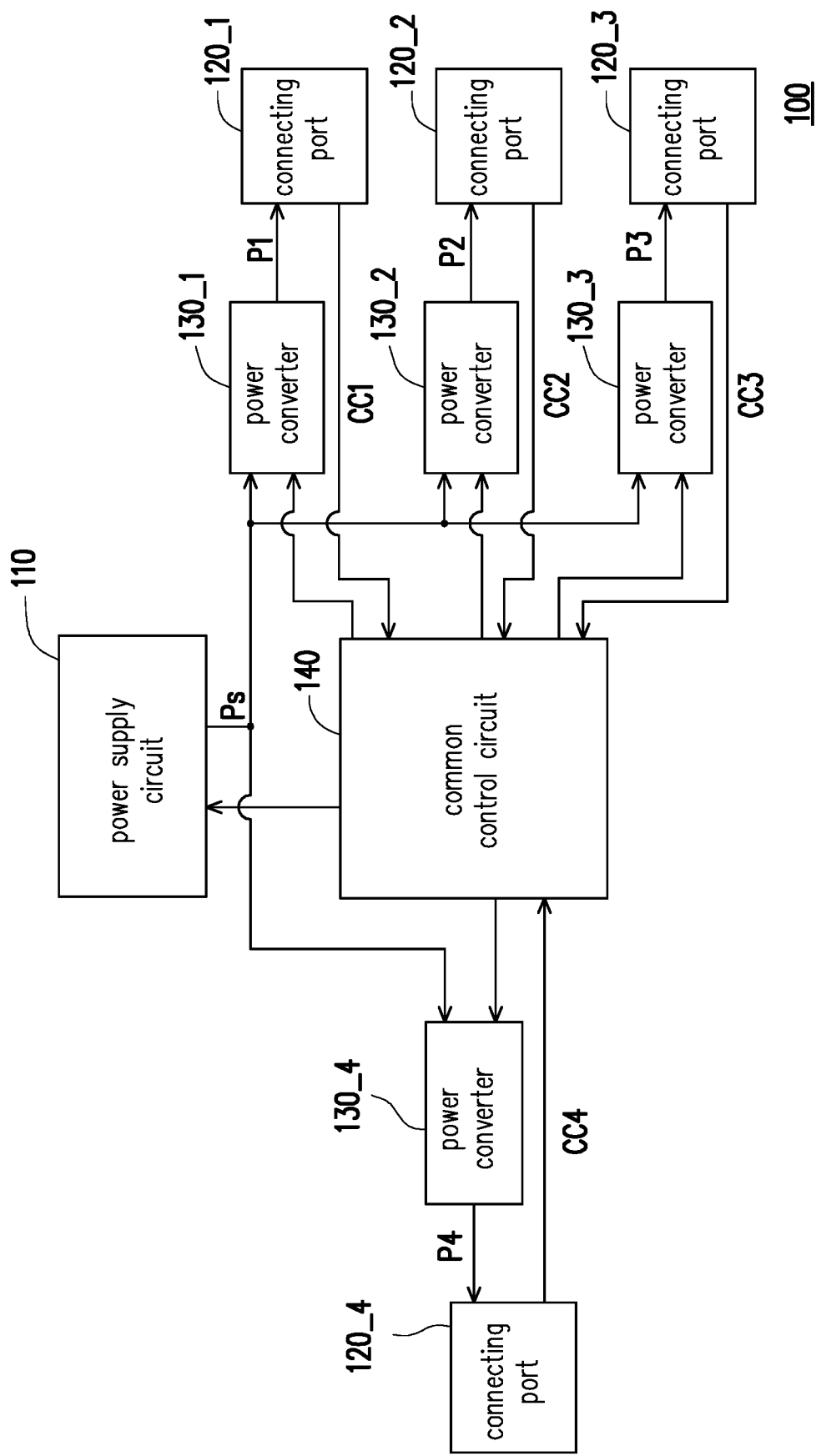
FIG. 1 is a circuit block diagram of a multi-port power supply apparatus according to an embodiment of the invention.

The term "couple or (connect)" used throughout the specification (including the claims) refers to any direct or indirect connection means. For example, if a first device is described to be coupled (or connected) to a second device in the text, it is interpreted that the first device may be directly connected to the second device, or that the first device may be indirectly connected to the second device via other devices or some connection means. Moreover, wherever possible, elements/components/steps labeled with the same reference numerals represent the same or similar parts in the drawings and embodiments. Reference may be made between the elements/components/steps labeled with the same reference numerals or described in the same terms in different embodiments for relevant descriptions.

FIG. 1 is a circuit block diagram of a multi-port power supply apparatus according to an embodiment of the invention. As shown in FIG. 1, a multi-port power supply apparatus 100 includes a power supply circuit 110, connecting ports 120_1 to 120_4, power converters 130_1 to 130_4, and a common control circuit 140. The number of the power converters 130_1 to 130_4 shown in FIG. 1 is four, and the number of the connecting ports 120_1 to 120_4 shown in FIG. 1 is also four. In other embodiments, the number of the power converters 130_1 to 130_4 and the number of the connecting ports 120_1 to 120_4 may be adjusted/set according to the design requirements.

According to the design requirements, in some embodiments, the power supply circuit 110 may include a voltage regulator or another power supply circuit that can regulate voltage, current, and/or power. According to the control of the common control circuit 140, the power supply circuit 110 can convert an external AC electric energy (or DC electric energy) into a DC electric energy (e.g., a source electric energy Ps shown in FIG. 1). The source electric energy Ps provided by the power supply circuit 110 may be supplied as power to the power converters 130_1 to 130_4.

In the present embodiment, the multi-port power supply apparatus 100 may supply power to different external electronic apparatuses (not shown) via the different connecting ports 120_1 to 120_4, and may learn configuration information CC1 to CC4 from the different external electronic apparatuses via the different connecting ports 120_1 to 120_4. According to the configuration information CC1 to CC4, the multi-port power supply apparatus 100 can learn the voltage demands and the power demands of the external electronic apparatuses (not shown). According to the design requirements, the connecting ports 120_1 to 120_4 may be universal serial bus (hereinafter referred to as USB) connecting ports or other connecting ports. For example, any one of the connecting ports 120_1 to 120_4 may be a USB T e-C (also referred to as USB-C) connecting port or a USB Type-A connecting port. For convenience of illustration, it is assumed in the embodiments below that the connecting ports 120_1 to 120_4 are USB connecting ports.

The power converters 130_1 to 130_4 are respectively coupled to the connecting ports 120_1 to 120_4 in a one-to-one manner. Namely, the output terminal of the power converter 130_1 is coupled to the power pin (the power bus pin, generally labeled as Vbus) of the connecting port 120_1, the output terminal of the power converter 130_2 is coupled to the power pin of the connecting port 120_2, the output terminal of the power converter 130_3 is coupled to the power pin of the connecting port 120_3, and the output terminal of the power converter 130_4 is coupled to the power pin of the connecting port 120_4. The input terminals of the power converters 130_1 to 130_4 are respectively coupled to the output terminal of the power supply circuit 110 to receive the source electric energy Ps. According to the control of the common control circuit 140, the power converter 130_1 can convert the source electric energy Ps into an output electric energy P1 and output the output electric energy P1 to the corresponding connecting port 120_1. According to the control of the common control circuit 140, the power converter 130_2 can convert the source electric energy Ps into an output electric energy P2 and output the output electric energy P2 to the corresponding connecting port 120_2. According to the control of the common control circuit 140, the power converter 130_3 can convert the source electric energy Ps into an output electric energy P3 and output the output electric energy P3 to the corresponding connecting port 120_3. According to the control of the common control circuit 140, the power converter 130_4 can convert the source electric energy Ps into an output electric energy P4 and output the output electric energy P4 to the corresponding connecting port 120_4.

The common control circuit 140 of the multi-port power supply apparatus 100 is coupled to the connecting ports 120_1 to 120_4 to learn the voltage demands and the power demands of the connecting ports 120_1 to 120_4. For example, in some embodiments, the common control circuit 140 may be coupled to the configuration channel (hereinafter referred to as CC) pins of the connecting ports 120_1 to 120_4 to obtain the configuration information CC1 to CC4. Taking the connecting port 120_1 as an example, the common control circuit 140 learns the configuration information CC1 of the external electronic apparatus (not shown) via the CC pin of the connecting port 120_1. The common control circuit 140 can know from the configuration information CC1 the voltage demand, the current demand, and/or the power demand of the connecting port 120_1 (i.e., the voltage demand, the current demand, and/or the power demand of the external electronic apparatus connected to the connecting port 120_1). Similarly, the common control circuit 140 can learn the voltage demands, the current demands, and/or the power demands of the connecting ports 120_2 to 120_4 from the configuration information CC2 to CC4 of the connecting ports 120_2 to 120_4.

The common control circuit 140 is coupled to the control terminals of the power converters 130_1 to 130_4. The common control circuit 140 may support a variety of USB protocols according to the design requirements to satisfy the transmission requirements of the connecting ports 120_1 to 120_4 of different specifications. For example, when any one of the connecting ports 120_1 to 120_4 is a USB Type-C connecting port, the common control circuit 140 may be a USB Type-C Port Controller (TCPC) or a USB Type-C Port Manager (TCPM) that supports the Power Delivery (PD) protocol. For another example, if the connecting ports 120_1 to 120_4 are USB Type-A connecting ports, the power converter 130_1~130_4 may be USB Type-A port managers that support the QC (Quick Charge) protocol. For a further example, when any one of the connecting ports 120_1 to 120_4 is connected to an external apparatus having a programmable power supply (PPS) function, the common control circuit 140 may support the PPS protocol. The PPS protocol/function is a conventional protocol/function and shall not be repeatedly described herein.

The common control circuit 140 controls the power converter 130_1 according to the voltage demand of the connecting port 120_1, such that the power converter 130_1 converts/adjusts the source electric energy Ps into the output electric energy P1 compatible with the voltage demand. Moreover, the power converter 130_1 outputs the adjusted output electric energy P1 to the power pin of the connecting port 120_1. Similarly, the common control circuit 140 controls the power converters 130_2 to 130_4 according to the voltage demands of the connecting ports 120_2 to 120_4, such that the power converters 130_2 to 130_4 output the adjusted output electric energies P2 to P4 respectively to the connecting ports 120_2 to 120_4.

After learning the voltage demands and the power demands of the connecting ports 120_1 to 120_4, the common control circuit 140 further correspondingly controls the power supply circuit 110 according to the voltage demands and the power demands of the connecting ports 120_1 to 120_4 to dynamically adjust the voltage, the current, and/or the power of the source electric energy Ps. For example, by adjusting the voltage of the source electric energy Ps, the common control circuit 140 can reduce the voltage difference between the source electric energy Ps and the output electric energies P1 to P4 as much as possible. Accordingly, the multi-port power supply apparatus 100 can dynamically adjust the source electric energy Ps according to the voltage demands and the power demands of the connecting ports 120_1 to 120_4 to thereby improve the voltage conversion efficiency of the power converters 130_1 to 130_4 of the multi-port power supply apparatus 100.

Figure 2:
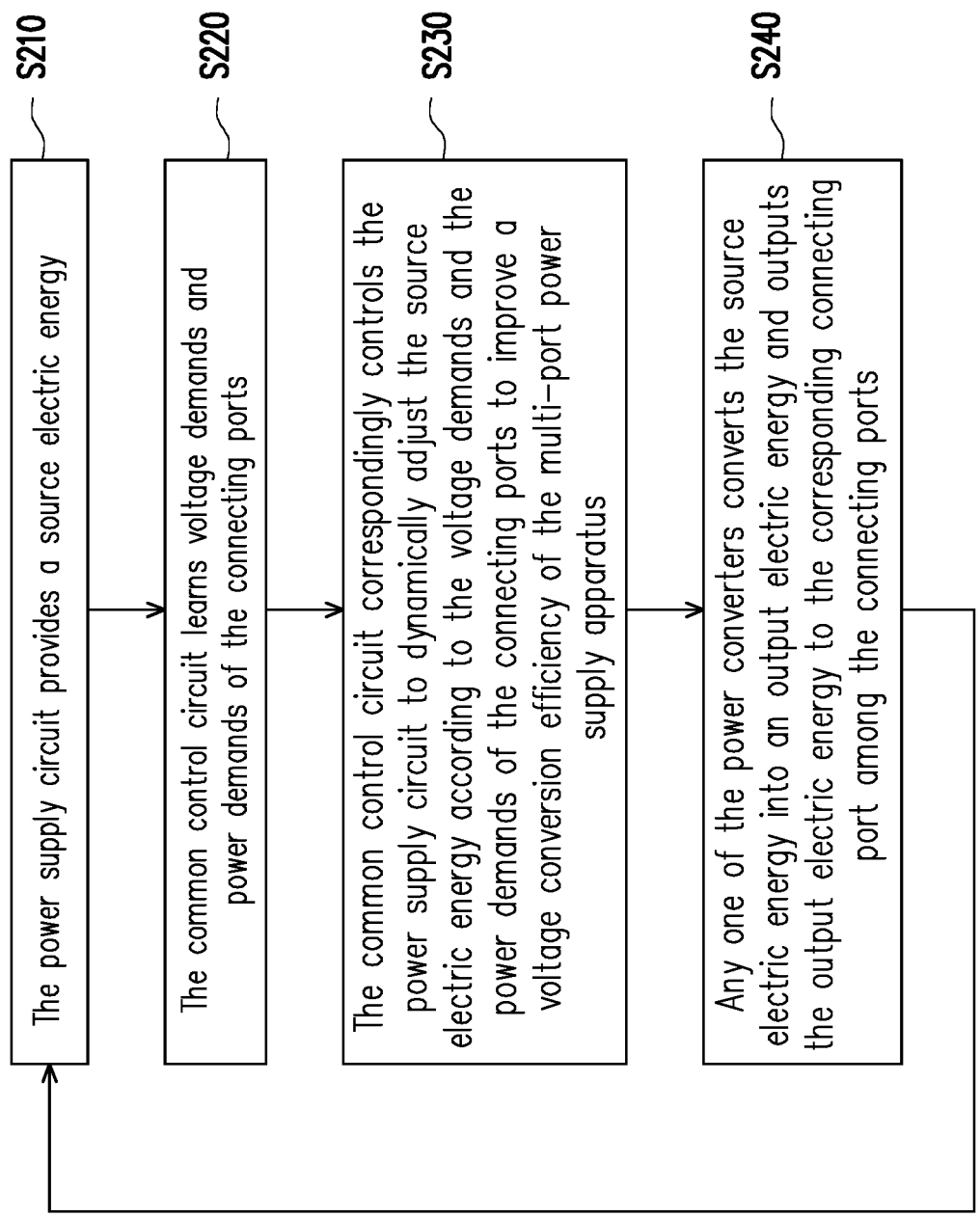
FIG. 2 is a flowchart of a power supplying method according to an embodiment of the invention.

FIG. 2 is a flowchart of a power supplying method according to an embodiment of the invention. In the embodiment of FIG. 1 and FIG. 2, in step S210, the power supply circuit 110 provides a source electric energy Ps to the power converters 130_1 to 130_4. In step S220, the common control circuit 140 learns a voltage demand and a power demand of the connecting port 120_1 from configuration information CC1 of the connecting port 120_1. Similarly, the common control circuit 140 learns voltage demands and power demands of the connecting ports 120_2 to 120_4 from configuration information CC2 to CC4 of the connecting ports 120_2 to 120_4.

In step S230, the common control circuit 140 correspondingly controls the power supply circuit 110 to dynamically adjust a voltage, a current, and/or a power of the source electric energy Ps according to the voltage demands and the power demands of the connecting ports 120_1 to 120_4 to thereby improve the voltage conversion efficiency of the multi-port power supply apparatus 100. Next, in step S240, the power converter 130_1 converts the source electric energy Ps into an output electric energy P1 and outputs the output electric energy P1 to the connecting port 120_1 to thereby provide the output electric energy P1 to an external electronic apparatus (not shown) connected to the connecting port 120_1. Similarly, the power converters 130_2 to 130_4 convert the source electric energy Ps into output electric energies P2 to P4 and output the output electric energies P2 to P4 to the connecting ports 120_2 to 120_4.

Further, in some embodiments, the common control circuit 140 may calculate the voltage value of the source electric energy Ps according to the voltage demands and the power demands of the connecting ports 120_1 to 120_4 to cause the power supply circuit 110 to dynamically adjust the voltage of the source electric energy Ps. In other embodiments, the common control circuit 140 may calculate the current value, the power value, and/or other electrical values of the source electric energy Ps according to the voltage demands and the power demands of the connecting ports 120_1 to 120_4 to cause the power supply circuit 110 to dynamically adjust the source electric energy Ps.

Figure 3:
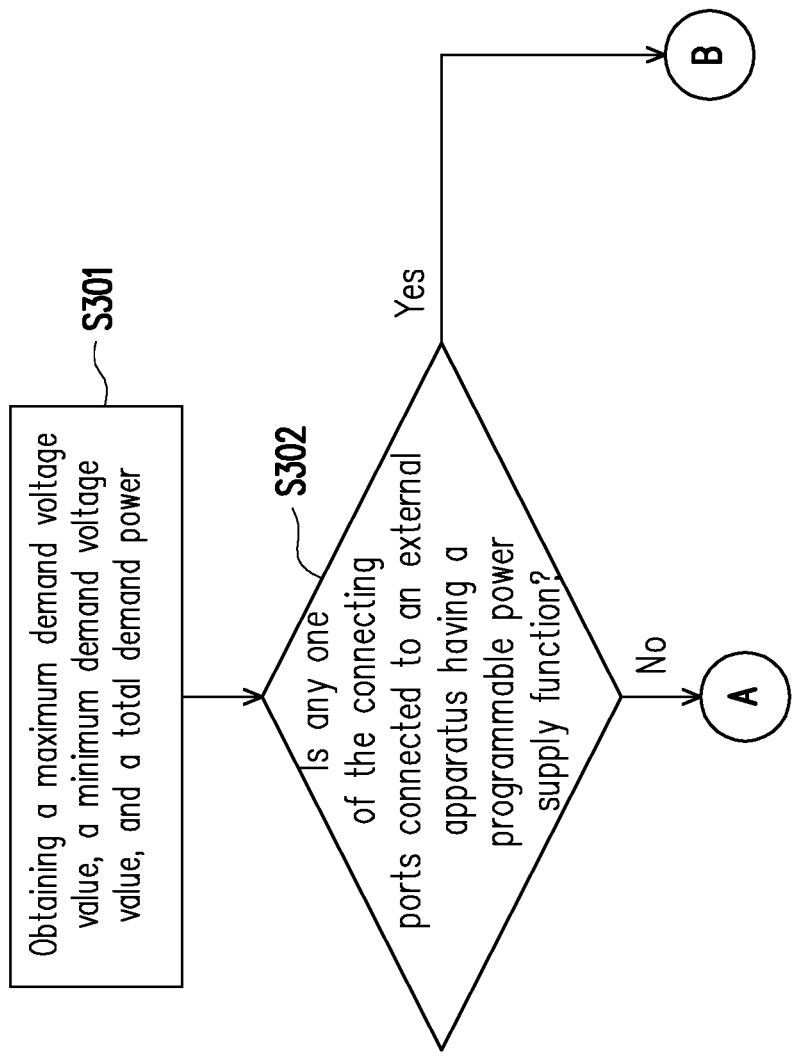
FIG. 3 to FIG. 5 are flowcharts of a power supplying method according to step S230 of FIG. 2.
Figure 4:
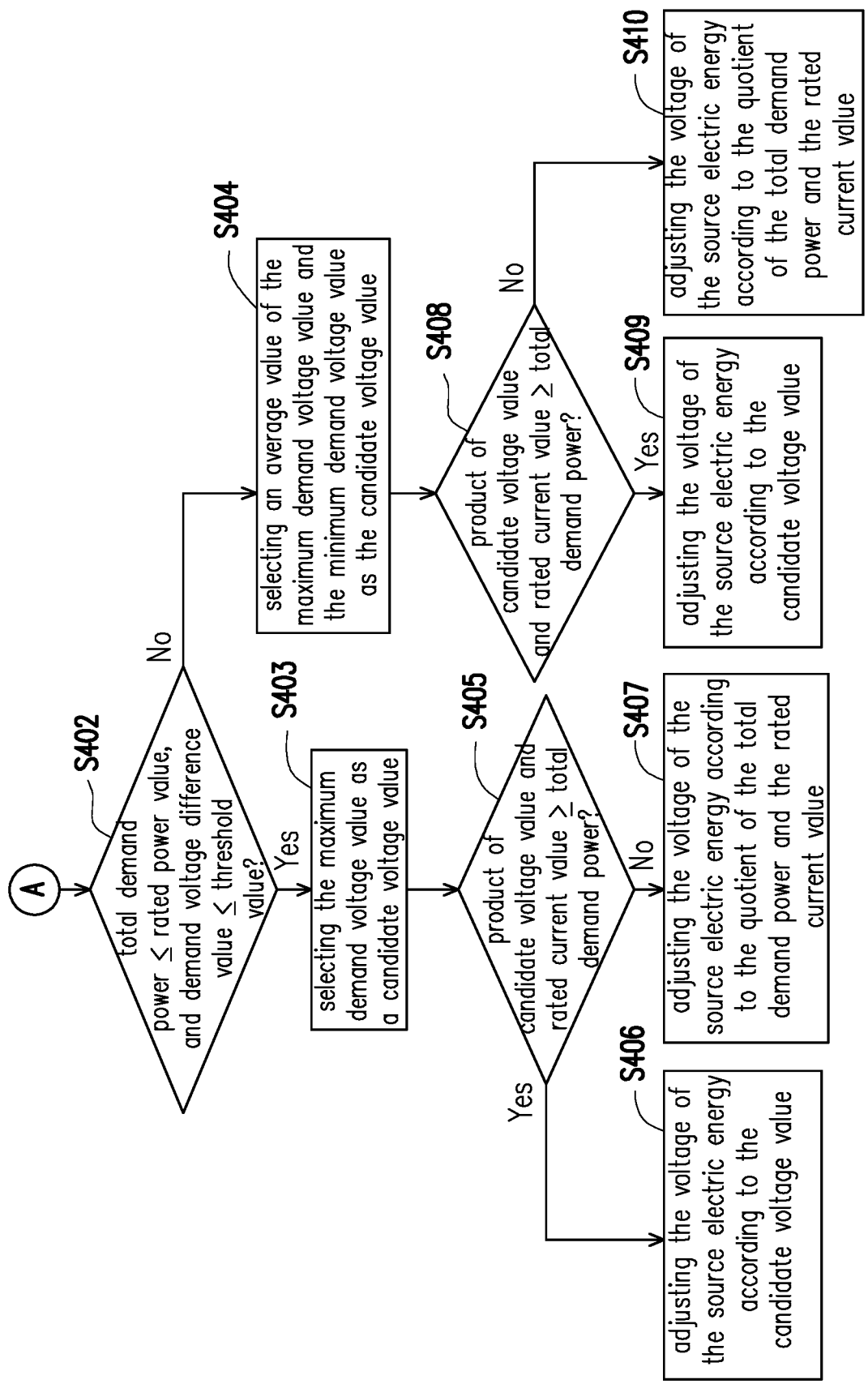
Figure 5:
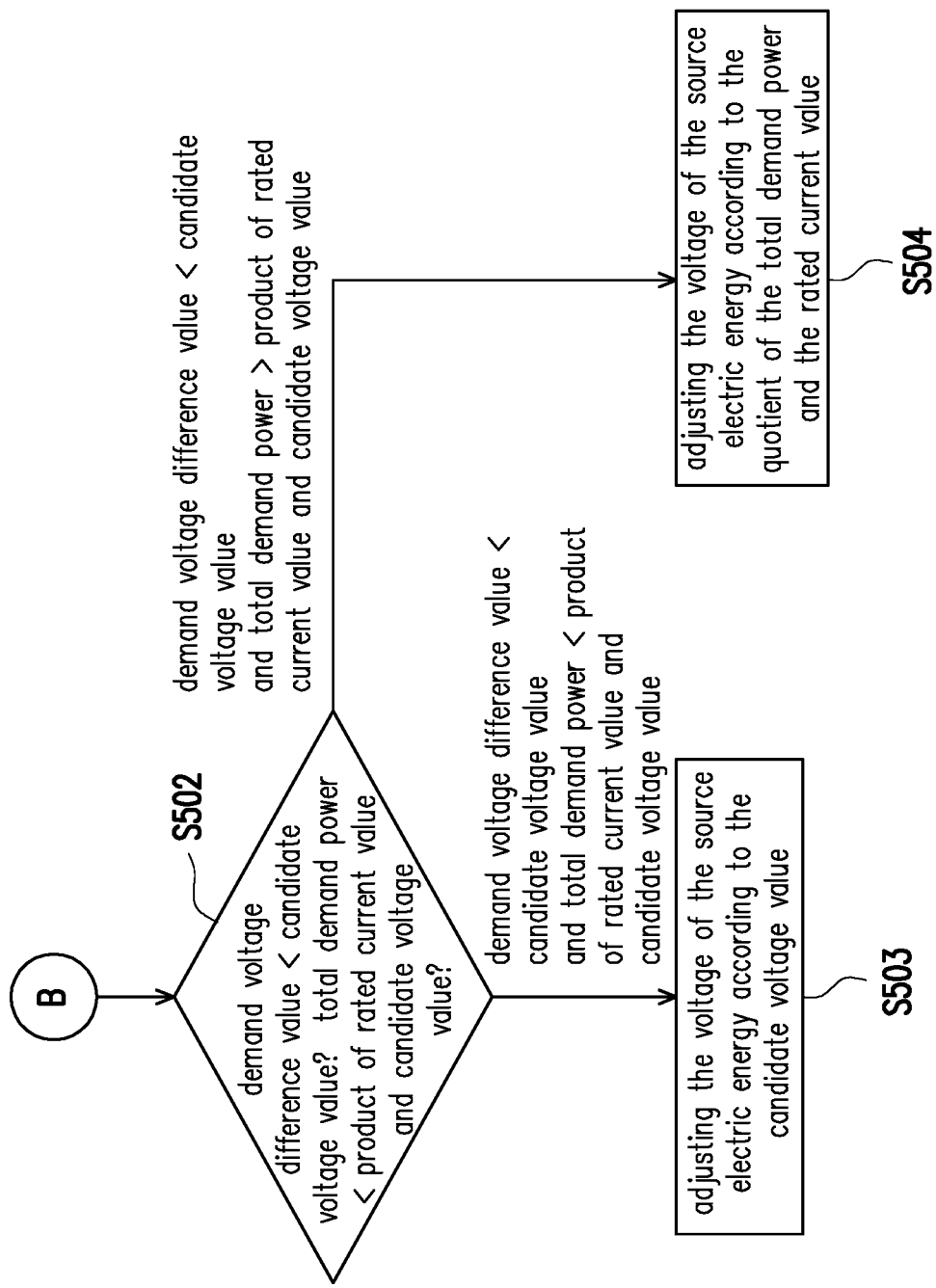

FIG. 3 to FIG. 5 are flowcharts of a power supplying method according to step S230 of FIG. 2. Referring to FIG. 1, FIG. 3, FIG. 4, and FIG. 5 at the same time, in step S301, the common control circuit 140 obtains a maximum demand voltage value and a minimum demand voltage value from the voltage demands of the connecting ports 120_1 to 120_4, and obtains a total demand power from the power demands of the connecting ports 120_1 to 120_4. The total demand power may be the total of the power demands of the connecting ports 120_1 to 120_4. The maximum demand voltage value may be the largest of the voltage demands of the connecting ports 120_1 to 120_4. The minimum demand voltage value may be the smallest of the voltage demands of the connecting ports 120_1 to 120_4. In the subsequent steps, the common control circuit 140 may calculate the voltage value of the source electric energy Ps according to the maximum demand voltage value, the minimum demand voltage value, and the total demand power.

In the present embodiment, in step S302, the common control circuit 140 determines whether the connecting ports 120_1 to 120_4 are connected to an external apparatus having a programmable power supply (PPS) function. If the common control circuit 140 determines in step S302 that none of the connecting ports 120_1 to 120_4 is connected to the external apparatus having the PPS function, then proceeding to step node A. Conversely, if the common control circuit 140 determines in step S302 that any one of the connecting ports 120_1 to 120_4 is connected to the external apparatus having the PPS function, then proceeding to step node B.

In the present embodiment, after it is determined in step S302 shown in FIG. 3 that none of the connecting ports 120_1 to 120_4 is connected to the external apparatus having the PPS function, the common control circuit 140 executes step S402 in FIG. 4. In step S402, the common control circuit 140 determines whether the total demand power is less than or equal to a rated power value of the power supply circuit 110, and determines whether a difference value (i.e., a demand voltage difference value) between the maximum demand voltage value and the minimum demand voltage value is less than or equal to a threshold value. The threshold value may be determined according to design requirements. The rated power value of the power supply circuit 110 may be the maximum value of the output power of the power supply circuit 110 (i.e., the maximum power of the source electric energy Ps). When the common control circuit 140 determines that the total demand power of the connecting ports 120_1 to 120_4 is less than or equal to the rated power value of the power supply circuit 110, and the demand voltage difference value is less than or equal to the threshold value (i.e., the determination result in step S402 is "Yes"), the common control circuit 140 proceeds to step S403. In step S403, the common control circuit 140 selects the maximum demand voltage value as a candidate voltage value. When the common control circuit 140 determines that the total demand power of the connecting ports 120_1 to 120_4 is greater than the rated power value of the power supply circuit 110, and/or the demand voltage difference value is greater than the threshold value (i.e., the determination result in step S402 is "No"), the common control circuit 140 proceeds to step S404. In step S404, the common control circuit 140 selects an average value of the maximum demand voltage value and the minimum demand voltage value as the candidate voltage value.

In subsequent steps S405 to S410, the common control circuit 140 calculates the voltage value of the source electric energy Ps according to the candidate voltage value. When the common control circuit 140 determines that a product of the candidate voltage value and a rated current value of the power supply circuit 110 is greater than or equal to the total demand power of the connecting ports 120_1 to 120_4, then the common control circuit 140 can adjust the voltage of the source electric energy Ps according to the candidate voltage value. The rated current value of the power supply circuit 110 may be a maximum value of the output current of the power supply circuit 110 (i.e., the maximum current of the source electric energy Ps). Conversely, when the common control circuit 140 determines that the product of the candidate voltage value and the rated current value of the power supply circuit 110 is less than the total demand power of the connecting ports 120_1 to 120_4, the common control circuit 140 can adjust the voltage of the source electric energy Ps according to a quotient of the total demand power and the rated current value.

Specifically, in the present embodiment, after selecting the maximum demand voltage value as the candidate voltage value in step S403, the common control circuit 140 proceeds to step S405. In step S405, the common control circuit 140 further determines whether the product of the candidate voltage value (i.e., the maximum demand voltage value) and the rated current value of the power supply circuit 110 is greater than or equal to the total demand power of the connecting ports 120_1 to 120_4. When the product of the maximum demand voltage value and the rated current value is greater than or equal to the total demand power (i.e., the determination result in step S405 is "Yes"), the common control circuit 140 proceeds to step S406. In step S406, the common control circuit 140 adjusts the voltage of the source electric energy Ps according to the candidate voltage value (i.e., the maximum demand voltage value). For example, the common control circuit 140 adjusts the voltage value of the source electric energy Ps to be the maximum demand voltage value.

Conversely, when the product of the maximum demand voltage value and the rated current value is less than the total demand power (i.e., the determination result in step S405 is "No"), the common control circuit 140 proceeds to step S407. In step S407, the common control circuit 140 adjusts the voltage of the source electric energy Ps according to the quotient of the total demand power and the rated current value. For example, assuming that the total demand power of the connecting ports 120_1 to 120_4 is H, and the rated current value of the power supply circuit 110 is Ir, then the common control circuit 140 adjusts the voltage value of the source electric energy Ps to be H/Ir.

On the other hand, after selecting the average value of the maximum demand voltage value and the minimum demand voltage value as the candidate voltage value in step S404, the common control circuit 140 proceeds to step S408. In step S408, the common control circuit 140 determines whether the product of the candidate voltage value (i.e., the average value) and the rated current value of the power supply circuit 110 is greater than or equal to the total demand power. When the product is greater than or equal to the total demand power (i.e., the determination result in step S408 is "Yes"), the common control circuit 140 proceeds to step S409. In step S409, the common control circuit 140 adjusts the voltage of the source electric energy Ps according to the candidate voltage value (i.e., the average value of the maximum demand voltage value and the minimum demand voltage value). For example, assuming that the maximum demand voltage value is A and the minimum demand voltage value is B, then the average value (i.e., candidate voltage value) is (A+B)/2, and the common control circuit 140 adjusts the voltage value of the source electric energy Ps to be (A+B)/2.

Conversely, when the product of the average value (i.e., the candidate voltage value) and the rated current value of the power supply circuit 110 is less than the total demand power (i.e., the determination result in step S408 is "No"), the common control circuit 140 proceeds to step S410. In step S410, the common control circuit 140 adjusts the voltage of the source electric energy Ps according to the quotient of the total demand power and the rated current value. For example, assuming that the total demand power of the connecting ports 120_1 to 120_4 is H, and the rated current value of the power supply circuit 110 is Ir, the common control circuit 140 adjusts the voltage value of the source electric energy Ps to be H/Ir.

Returning to step S302 shown in FIG. 3, when the common control circuit 140 determines in step S302 that any one of the connecting ports 120_1 to 120_4 is connected to the external apparatus having the PPS function, the common control circuit 140 may calculate the voltage of the source electric energy Ps according to the demand voltage difference value (i.e., the difference value between the maximum demand voltage value and the minimum demand voltage value), the total demand power, and one candidate voltage value associated with the PPS function. Specifically, the candidate voltage value in FIG. 5 may be determined according to the design requirements, and the candidate voltage value is compatible with the voltage definition of the PPS function. For example, the candidate voltage value may be set to 5 V or another voltage value according to the design requirements.

The common control circuit 140 executes step S502 in FIG. 5. In step S502, the common control circuit 140 determines whether the total demand power of the connecting ports 120_1 to 120_4 is less than the product of the rated current value of the power supply circuit 110 and the candidate voltage value, and determines whether the demand voltage difference value (i.e., the difference value between the maximum demand voltage value and the minimum demand voltage value) is less than the candidate voltage value. When the common control circuit 140 determines in step S502 that the demand voltage difference value is less than the candidate voltage value, and the total demand power is less than the product of the rated current value of the power supply circuit 110 and the candidate voltage value, the common control circuit 140 proceeds to step S503. In step S503, the common control circuit 140 adjusts the voltage of the source electric energy Ps according to the candidate voltage value. For example, assuming that the candidate voltage value is 5 V, the demand voltage difference value is C, the total demand power of the connecting ports 120_1 to 120_4 is H, and the rated current value of the power supply circuit 110 is Ir, then when C is less than 5 V and H is less than Ir*5 V, the common control circuit 140 can adjust the voltage value of the source electric energy Ps to be 5 V.

When the common control circuit 140 determines in step S502 that the demand voltage difference value is less than the candidate voltage value, and the total demand power is greater than the product of the rated current value and the candidate voltage value, the common control circuit 140 proceeds to step S504. In step S504, the common control circuit 140 adjusts the voltage of the source electric energy Ps according to the quotient of the total demand power and the rated current value. For example, assuming that the candidate voltage value is 5 V, the demand voltage difference value is C, the total demand power of the connecting ports 120_1 to 120_4 is H, and the rated current value of the power supply circuit 110 is Ir, then when C is less than 5 V and H is greater than Ir*5 V, the common control circuit 140 can adjust the voltage value of the source electric energy Ps to be H/Ir.

Table 1 is a power supply comparison table of a multi-port power supply apparatus according to an embodiment of the invention.

TABLE 1

| Configuration | CC1 | CC2 | CC3 | CC4 | Total demand power | Voltage/current of Ps |
|---|---|---|---|---|---|---|
| 1 | 5 V/3 A | 5 V/3 A | 5 V/3 A | 5 V/3 A | 60 W | 12 V/5 A |
| 2 | 5 V/3 A | | | | 15 W | 5 V/3 A |
| 3 | 20 V/3 A | | | | 60 W | 20 V/3 A |
| 4 | 5 V/3 A | 20 V/2.25 A | | | 60 W | 12.5 V/4.8 A |
| 5 | 15 V/1 A | 15 V/1 A | 15 V/1 A | 15 V/1 A | 60 W | 15 V/4 A |
| 6 | 9 V/1 A | 9 V/1 A | 9 V/1 A | 9 V/1 A | 36 W | 9 V/4 A |
| 7 | 5 V/3 A | 9 V/2 A | | | 33 W | 9 V/3.67 A |
| 8 | 5 V/3 A | 12 V/3 A | | | 51 W | 10.2 V/5 A |
| 9 | 3 V/3 A | | | | 9 W | 5 V/1.8 A |
| 10 | 3 V/3 A | 3 V/3 A | 3 V/3 A | 3 V/3 A | 36 W | 7.2 V/5 A |

Referring to FIG. 1, FIG. 3, FIG. 4, FIG. 5, and Table 1 at the same time, in the present embodiment, the power supply comparison table of Table 1 lists examples of 10 configurations. In the 1$^{st}$ configuration to the 8$^{th}$ configuration, it is assumed that none of the connecting ports 120_1 to 120_4 is connected to the external apparatus having the PPS function. In the 9$^{th}$ configuration and the 10$^{th}$ configuration, it is assumed that any one of the connecting ports 120_1 to 120_4 is connected to the external apparatus having the PPS function. In the embodiments shown in Table 1, the rated power value of the power supply circuit 110 is assumed to be 60 W, the threshold value in step S402 is assumed to be 5 V, the rated current value of the power supply circuit 110 is assumed to be 5 A, and the candidate voltage value in step S502 is assumed to be 5 V.

First, taking the 1$^{st}$ configuration as an example, in the 1$^{st}$ configuration, in step S301 in FIG. 3, the common control circuit 140 can learn from the configuration information CC1 to CC4 of the connecting ports 120_1 to 120_4 that the voltage demands of the connecting ports 120_1 to 120_4 are all 5 V, and the current demands of the connecting ports 120_1 to 120_4 are all 3 A. Therefore, the total demand power of the connecting ports 120_1 to 120_4 is 5*3+5*3+5*3+5*3=60 W. In step S302 in FIG. 3, the common control circuit 140 can learn from the configuration information CC1 to CC4 of the connecting ports 120_1 to 120_4 that none of the connecting ports 120_1 to 120_4 is connected to the external apparatus having the PPS function. Therefore, the common control circuit 140 executes steps S402, S403, S405, and S407 in FIG. 4. In the 2$^{nd}$ configuration, the common control circuit 140 can learn from the configuration information CC1 that the demand voltage of the external apparatus connected to the connecting port 120_1 is 5 V and the demand current is 3 A, and can also learn from the configuration information CC2 to CC4 that the connecting ports 120_2 to 120_4 are not connected to the external apparatuses. Therefore, the total demand power of the connecting ports 120_1 to 120_4 is 5*3+0+0+0=15 W. Therefore, the common control circuit 140 executes steps S402, S403, S405, and S406 in FIG. 4. Similarly, in the 3$^{rd}$ configuration, the 5$^{th}$ configuration, the 6$^{th}$ configuration, and the 7$^{th}$ configuration, the common control circuit 140 executes steps S402, S403, S405, and S406 in FIG. 4; in the 4$^{th}$ configuration, the common control circuit 140 executes steps S402, S404, S408, and S409 in FIG. 4; in the 8$^{th}$ configuration, the common control circuit 140 executes steps S402, S404, S408, and S410 in FIG. 4; in the 9$^{th}$ configuration, the common control circuit 140 executes steps S502 and S503 in FIG. 5; and in the 10$^{th}$ configuration, the common control circuit 140 executes steps S502 and S504 in FIG. 5.

In some embodiments, when the common control circuit 140 determines that any one (e.g., the connecting port 120_1) of the connecting ports 120_1 to 120_4 is connected to the external apparatus having the PPS function, the common control circuit 140 may control the power converters (e.g., the power converters 130_2 to 130_4) corresponding to other connecting ports (e.g., the connecting ports 120_2 to 120_4) to maintain the output voltage and the output current of the connecting ports 120_2 to 120_4 respectively at 5 V and 900 mA.

Figure 6:
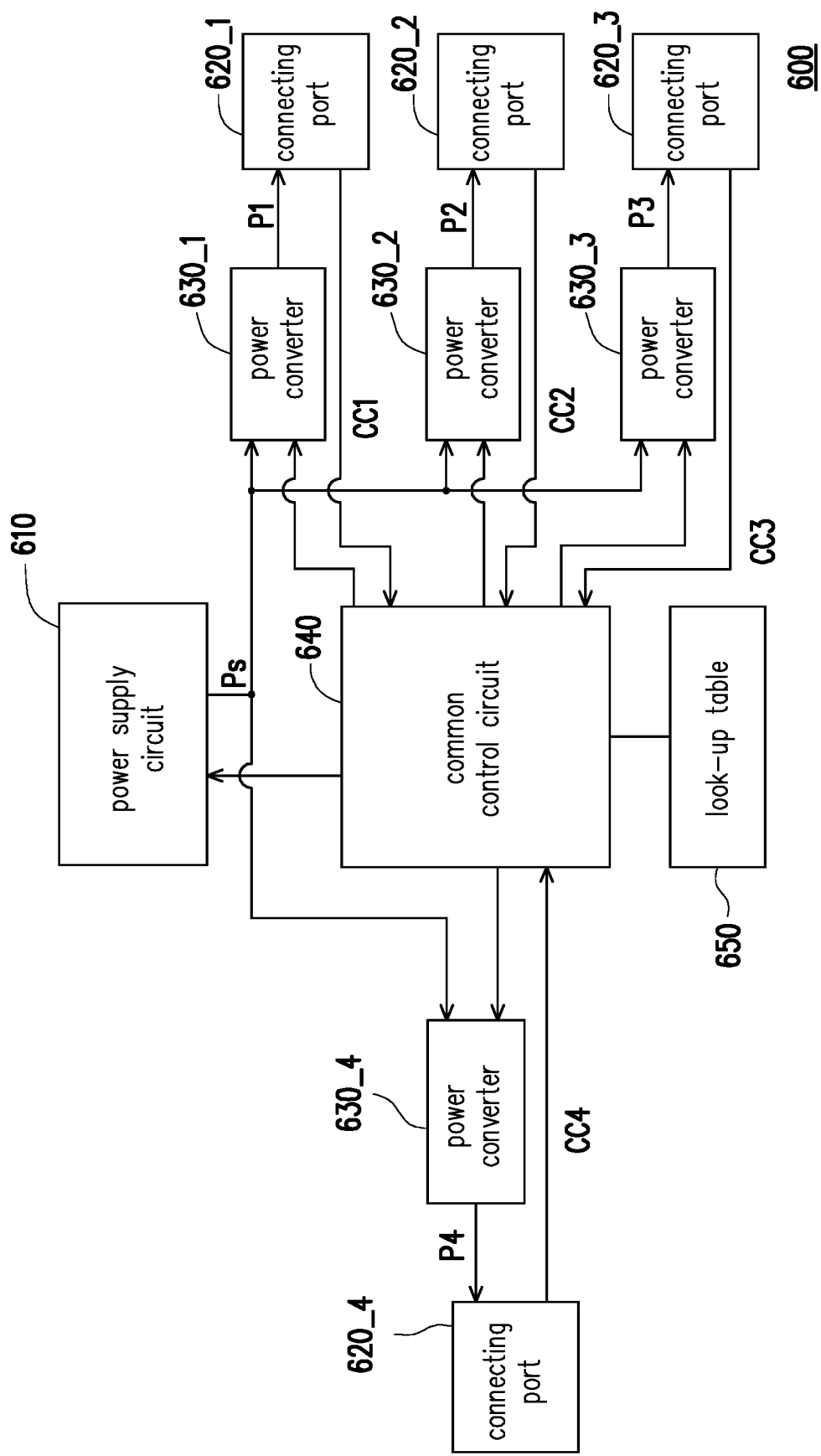
FIG. 6 is a circuit block diagram of a multi-port power supply apparatus according to another embodiment of the invention.

FIG. 6 is a circuit block diagram of a multi-port power supply apparatus 600 according to another embodiment of the invention. As shown in FIG. 6, the multi-port power supply apparatus 600 includes a power supply circuit 610, connecting ports 620_1 to 620_4, power converters 630_1 to 630_4, a common control circuit 640, and a look-up table 650. Reference may be made to the relevant descriptions of the multi-port power supply apparatus 100, the power supply circuit 110, the connecting ports 120_1 to 120_4, the power converters 130_1 to 130_4, and the common control circuit 140 in FIG. 1 to FIG. 5 to infer the multi-port power supply apparatus 600, the power supply circuit 610, the connecting ports 620_1 to 620_4, the power converters 630_1 to 630_4, and the common control circuit 640 shown in FIG. 6, which shall not be repeatedly described herein. Different from FIG. 1, the multi-port power supply apparatus 600 of FIG. 6 further includes the look-up table 650. The look-up table 650 is configured to store the voltage demands of the connecting ports 620_1 to 620_4, the total demand power of the connecting ports 620_1 to 620_4, and the associations with the voltage value of the source electric energy Ps. For example, the content stored in the look-up table 650 may be associated with the power supply comparison table (Table 1) described above. The common control circuit 640 may obtain a voltage value from the look-up table 650 according to the voltage demands and the power demands of the connecting ports 620_1 to 620_4 and control the power supply circuit 610 according to the voltage value to dynamically adjust the voltage of the source electric energy Ps. For example, when the common control circuit 640 determines the 1st configuration as shown in Table 1 according to the voltage demands and the power demands of the connecting ports 620_1 to 620_4, the common control circuit 640 can control the power supply circuit 610 to dynamically adjust the voltage of the source electric energy Ps to thereby provide a source electric energy Ps of 12 V and 5 A.

In summary of the above, in the embodiments of the invention, the multi-port power supply apparatus can learn the voltage demands and the power demands of the plurality of connecting ports from the configuration information of the plurality of connecting ports. According to the status of the changing voltage demand and power demand, the common control circuit can control the power supply circuit to adjust the source electric energy, such that the voltage, the current, and/or the power of the source electric energy can be adapted to the demands of the power converters of all the connecting ports. For example (as in the example of FIG. 1), by adjusting the voltage of the source electric energy, the common control circuit can reduce the voltage difference between the source electric energy and the output electric energy as much as possible. Therefore, the voltage conversion efficiency of the multi-port power supply apparatus can be improved.

Although the invention has been disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A multi-port power supply apparatus comprising:
   a power supply circuit configured to provide a source electric energy;
   a plurality of connecting ports;
   a plurality of power converters respectively coupled to the connecting ports in a one-to-one manner, wherein the power converters are coupled to the power supply circuit to receive the source electric energy, and any one of the power converters converts the source electric energy into an output electric energy and outputs the output electric energy to a corresponding connecting port among the connecting ports; and
   a common control circuit coupled to the connecting ports to learn voltage demands and power demands of the connecting ports, wherein the common control circuit is configured to:
      obtain a maximum demand voltage value and a minimum demand voltage value from the voltage demands, obtain a total demand power from the power demands,
      determine whether the total demand power is less than or equal to a rated power value of the power supply circuit, and determine whether a demand voltage difference value between the maximum demand voltage value and the minimum demand voltage value is less than or equal to a threshold value,
      when the total demand power is less than or equal to the rated power value, and the demand voltage difference value is less than or equal to the threshold value, the common control circuit selects the maximum demand voltage value as a candidate voltage value, and otherwise, the common control circuit selects an average value of the maximum demand voltage value and the minimum demand voltage value as the candidate voltage value, and
      dynamically calculates the voltage of the source electric energy according to the candidate voltage value to improve a voltage conversion efficiency of the multi-port power supply apparatus.

2. The multi-port power supply apparatus according to claim 1, wherein the common control circuit controls a first power converter among the power converters to dynamically adjust a first output electric energy in the output electric energy according to a first voltage demand of a first connecting port among the connecting ports, and the first power converter outputs the first output electric energy to the first connecting port.

3. The multi-port power supply apparatus according to claim 1, wherein:
   when a product of the candidate voltage value and a rated current value of the power supply circuit is greater than or equal to the total demand power, the common control circuit adjusts the voltage of the source electric energy according to the candidate voltage value, and
   when the product of the candidate voltage value and the rated current value of the power supply circuit is less than the total demand power, the common control circuit adjusts the voltage of the source electric energy according to a quotient of the total demand power and the rated current value.

4. The multi-port power supply apparatus according to claim 1, wherein:
   the common control circuit is further configured to determine whether any one of the connecting ports is connected to an external apparatus having a programmable power supply function, and
   when any one of the connecting ports is connected to the external apparatus having the programmable power supply function, the common control circuit calculates the voltage of the source electric energy according to a demand voltage difference value between the maximum demand voltage value and the minimum demand voltage value, the total demand power, and a candidate voltage value associated with the programmable power supply function.

5. The multi-port power supply apparatus according to claim 4, wherein:
   when the demand voltage difference value is less than the candidate voltage value, and the total demand power is less than a product of a rated current value of the power supply circuit and the candidate voltage value, the common control circuit adjusts the voltage of the source electric energy according to the candidate voltage value, and
   when the demand voltage difference value is less than the candidate voltage value, and the total demand power is greater than the product of the rated current value and the candidate voltage value, the common control circuit adjusts the voltage of the source electric energy according to a quotient of the total demand power and the rated current value.

6. The multi-port power supply apparatus according to claim 1, wherein the common control circuit comprises:
   a look-up table configured to store the voltage demands of the connecting ports, a total demand power of the power demands of the connecting ports, and associations with a voltage value of the source electric energy,
   wherein the common control circuit obtains the voltage value from the look-up table according to the voltage demands and the power demands of the connecting ports and dynamically adjusts a voltage of the source electric energy according to the voltage value.

7. A power supplying method adapted for a multi-port power supply apparatus, the multi-port power supply apparatus comprising a power supply circuit, a plurality of connecting ports, a plurality of power converters, and a common control circuit, the power supplying method comprising:

providing, by the power supply circuit, a source electric energy;
learning, by the common control circuit, voltage demands and power demands of the connecting ports;
correspondingly controlling, by the common control circuit, the power supply circuit to dynamically adjust the source electric energy according to the voltage demands and the power demands of the connecting ports to improve a voltage conversion efficiency of the multi-port power supply apparatus; and
converting, by any one of the power converters, the source electric energy into an output electric energy and outputting the output electric energy to a corresponding connecting port among the connecting ports,
wherein the step of calculating the voltage of the source electric energy according to the maximum demand voltage value, the minimum demand voltage value, and the total demand power comprises:
obtaining, by the common control circuit, a maximum demand voltage value and a minimum demand voltage value from the voltage demands, and obtaining a total demand power from the power demands;
determining, by the common control circuit, whether the total demand power is less than or equal to a rated power value of the power supply circuit, and determining whether a demand voltage difference value between the maximum demand voltage value and the minimum demand voltage value is less than or equal to a threshold value;
when the total demand power is less than or equal to the rated power value, and the demand voltage difference value is less than or equal to the threshold value, selecting, by the common control circuit, the maximum demand voltage value as a candidate voltage value, and otherwise, selecting, by the common control circuit, an average value of the maximum demand voltage value and the minimum demand voltage value as the candidate voltage value; and
calculating, by the common control circuit, the voltage of the source electric energy according to the candidate voltage value.

8. The power supplying method according to claim 7, wherein the step of converting, by any one of the power converters, the source electric energy into the output electric energy and outputting the output electric energy to the corresponding connecting port among the connecting ports comprising:
controlling, by the common control circuit, a first power converter among the power converters to dynamically adjust a first output electric energy in the output electric energy according to a first voltage demand of a first connecting port among the connecting ports;
outputting, by the first power converter, the first output electric energy to the first connecting port.

9. The power supplying method according to claim 7, wherein the step of calculating the voltage of the source electric energy according to the candidate voltage value further comprises:
when a product of the candidate voltage value and a rated current value of the power supply circuit is greater than or equal to the total demand power, adjusting, by the common control circuit, the voltage of the source electric energy according to the candidate voltage value; and
when the product of the candidate voltage value and the rated current value of the power supply circuit is less than the total demand power, adjusting, by the common control circuit, the voltage of the source electric energy according to a quotient of the total demand power and the rated current value.

10. The power supplying method according to claim 7, wherein the step of calculating the voltage of the source electric energy further comprises:
determining, by the common control circuit, whether any one of the connecting ports is connected to an external apparatus having a programmable power supply function; and
when any one of the connecting ports is connected to the external apparatus having the programmable power supply function, calculating, by the common control circuit, the voltage of the source electric energy according to a demand voltage difference value between the maximum demand voltage value and the minimum demand voltage value, the total demand power, and a candidate voltage value associated with the programmable power supply function.

11. The power supplying method according to claim 10, wherein the step of calculating the voltage of the source electric energy according to the demand voltage difference value, the total demand power, and the candidate voltage value comprises:
when the demand voltage difference value is less than the candidate voltage value, and the total demand power is less than a product of a rated current value of the power supply circuit and the candidate voltage value, adjusting, by the common control circuit, the voltage of the source electric energy according to the candidate voltage value; and
when the demand voltage difference value is less than the candidate voltage value, and the total demand power is greater than the product of the rated current value and the candidate voltage value, adjusting, by the common control circuit, the voltage of the source electric energy according to a quotient of the total demand power and the rated current value.

12. The power supplying method according to claim 7, wherein:
the multi-port power supply apparatus further comprises a look-up table, and
the step of correspondingly controlling the power supply circuit to dynamically adjust the source electric energy according to the voltage demands and the power demands comprises:
storing, by the look-up table, the voltage demands of the connecting ports, a total demand power of the power demands of the connecting ports, and associations with a voltage value of the source electric energy;
obtaining, by the common control circuit, the voltage value from the look-up table according to the voltage demands and the power demands of the connecting ports; and
dynamically adjusting, by the common control circuit, a voltage of the source electric energy according to the voltage value.

* * * * *